(12) United States Patent
Harada et al.

(10) Patent No.: US 8,851,448 B2
(45) Date of Patent: Oct. 7, 2014

(54) MOTOR-OPERATED VALVE

(75) Inventors: Takao Harada, Tokyo (JP); Kensuke Tabuchi, Tokyo (JP); Tatsuya Yoshida, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 136 days.

(21) Appl. No.: 13/337,387

(22) Filed: Dec. 27, 2011

(65) Prior Publication Data

US 2012/0248355 A1 Oct. 4, 2012

(30) Foreign Application Priority Data

Mar. 31, 2011 (JP) ................... 2011-078702

(51) Int. Cl.
*F16K 31/02* (2006.01)
*F16K 31/04* (2006.01)

(52) U.S. Cl.
CPC ..................... *F16K 31/04* (2013.01)
USPC ............ 251/129.11; 251/85; 251/337

(58) Field of Classification Search
USPC .............. 251/129.07, 129.11, 85, 97, 129.12, 251/129.13, 337
See application file for complete search history.

(56) References Cited

U.S. PATENT DOCUMENTS

| 5,114,116 | A | * | 5/1992 | Muller et al. | 251/129.15 |
|---|---|---|---|---|---|
| 6,021,997 | A | * | 2/2000 | Hell | 251/30.04 |
| 6,224,034 | B1 | * | 5/2001 | Kato et al. | 251/164 |
| 6,460,567 | B1 | * | 10/2002 | Hansen et al. | 137/554 |
| 6,561,480 | B1 | * | 5/2003 | Komiya et al. | 251/129.12 |
| 7,017,882 | B2 | * | 3/2006 | Marsh et al. | 251/77 |
| 7,325,780 | B2 | * | 2/2008 | Arai et al. | 251/65 |
| 7,758,013 | B2 | * | 7/2010 | Arai et al. | 251/85 |
| 7,857,282 | B2 | * | 12/2010 | Goossens | 251/129.07 |
| 2004/0041112 | A1 | * | 3/2004 | Goossens et al. | 251/129.07 |
| 2006/0180780 | A1 | * | 8/2006 | Arai et al. | 251/129.11 |
| 2007/0018128 | A1 | * | 1/2007 | Arai | 251/129.11 |
| 2008/0067464 | A1 | * | 3/2008 | Arai et al. | 251/319 |
| 2008/0247694 | A1 | | 10/2008 | Hatano et al. | |
| 2012/0323379 | A1 | * | 12/2012 | Robertson, III | 700/282 |

FOREIGN PATENT DOCUMENTS

JP 2003-130235 A 5/2003

* cited by examiner

*Primary Examiner* — John K Fristoe, Jr.
*Assistant Examiner* — Matthew W Jellett
(74) *Attorney, Agent, or Firm* — Bacon & Thomas, PLLC

(57) ABSTRACT

To provide a small motor-operated valve which can control a high flow, there is provided a motor-operated valve of which a body has an orifice, seat and a valve element provided opposite to the seat. The valve element is operated by a driver which is driven to rotate by an output gear to which the rotation of a rotor having been reduced by means of a mechanical paradox planetary gear mechanism is transmitted. To force the valve element in the direction in which the valve is opened, a coil spring is disposed in a bore formed in the upper portion of the body oppositely to a bush.

8 Claims, 4 Drawing Sheets

MOTOR-OPERATED VALVE

BACKGROUND OF THE INVENTION

1. Technical Field

The present invention relates to a motor-operated valve destined to control the flow rate of fluids, for example, a refrigerant used in air conditioners.

2. Description of the Conventional Art

The structure of a motor-operated valve invented by the Applicant of the present invention is disclosed in detail in the Japanese Published Unexamined Application No. 101765 of 2008. As disclosed in this patent document, the motor-operated valve uses a mechanical paradox planetary gear mechanism to considerably reduce the speed of rotation of a stepping motor provided to let the valve disc ascend and descend, thereby providing micro-flow control of a refrigerant or the like.

FIG. 4 shows the structure of a motor-operated valve similar to that disclosed in the Japanese Published Unexamined Application No. 101765 of 2008. In FIG. 4, the essential parts of the motor-operated valve are shown hatched.

This motor-operated valve is designed to be larger in bore diameter of the valve element than disclosed in the cited patent document and accordingly the front end of the valve element is enlarged correspondingly to the increase in bore diameter of the valve seat.

As shown, the motor-operated valve includes a body 10 having formed therein a valve chamber 14 and an orifice 16 communicating with the chamber 14.

The body 10 has connected thereto a pipe 12a at the side of the orifice 16 and a pipe 12b at the side of an opening formed in the side wall of the chamber 14. Also the body 10 has inserted and fixed in the upper portion of the chamber 14 thereof a bush 20.

The bush 20 has an internal thread 22 formed on the inner wall of the central bore thereof. A base plate 28 is firmly fixed to the top of the body 10. A bottomed cylindrical can 30 is installed on the base plate 28.

On the outer circumference of the can 30 there is fitted a stator member generally indicated with a reference sign 40. The stator member 40 includes a yoke 44 and a coil 46 wound on a bobbin provided inside the yoke 44. These elements of the stator member 40 are wholly covered with a plastic member 42. The coil 46 is supplied with a power through a lead wire 48. The stator member 40 and a rotor member 50 pivotally supported inside the can 30 form together a stepping motor.

The rotor member 50 made of a magnetic material is connected integrally with a sun gear member 51 made of a plastic material, and a shaft 62 is inserted in the central portion of the sun gear member 51. The shaft 62 is inserted and supported at the upper portion thereof in a hole formed in a support member 60 provided inside the upper portion of the can 30, and at the lower portion thereof in a hole formed in the upper portion of a shank 70a which will be further described later.

The sun gear member 51 includes a sun gear 52 which is in mesh with a plurality of planetary gears 55 supported pivotably on a plurality of shafts 54, respectively, provided upright on a carrier 53. Each of the planetary gears 55 is axially long and in mesh at the upper half thereof with a ring gear 58 mounted on the top of a cylindrical member 24 installed on the top of the bush 20.

The planetary gear 55 is in mesh at the lower half thereof with an internal gear 71 of an annular output gear 70.

The above-mentioned gears form together a so-called "mechanical paradox planetary gear mechanism". With the ring gear 58 and the internal gear 71 of the output gear 70 being designed a little different in number of teeth from each other, it is possible to reduce the rotation of the sun gear 52 at a large ratio for transmission to the output gear 70.

The output gear 70 has a downward extending shank 70a firmly fixed to the center of the lower surface thereof. A slit 73a is formed in the lower portion of the shank 70a. Also a driver 72 is provided. The driver 72 has formed at the top thereof a flat convexity (flat plate-shaped portion) 73b which is to be inserted in the slit 73a in the shank 70a. The slit 73a and flat plate-shaped portion 73b form together a coupling which connects the output gear 70 and driver 72.

The driver 72 has an external thread 74 formed thereon. The external thread 74 is in mesh with the internal thread 22 formed inside the bush 20. Thus, the driver 72 moves axially while rotating. This axial movement of the driver 72 is transmitted to a shaft-shaped valve element 80 through a ball-shaped pressing member 76. The ball-shaped pressing member 76 prevents the rotation of the driver 72 from being transmitted to the valve element 80.

The body 10 has fixed therein a tubular spring case 90 having a small-diameter portion 90c. Guided by the lower small-diameter portion 90c of the tubular spring case 90, the valve element 80 is moved axially. In this motor-operated valve cited herein by way of example, a flange 90a is provided at the top of the spring case 90. It is held between the upper end face of a small-diameter portion formed at the top of the body 10 and the lower surface of the bush 20, and thus the spring case 90 is fixed inside the body 10.

A spring shoe member 84 is firmly fixed at the top of the valve element 80, and a coil spring 92 is provided compressed between the lower surface of a large-diameter portion 84d formed at the top of the spring shoe member 84 and a stepped portion 90b of the spring case 90. The coil spring 92 normally forces the valve element 80 in a direction in which the valve is opened.

SUMMARY OF THE INVENTION

In the motor-operated motor having been described in the above, the spring case 90 which guides the valve element 80 is disposed to project in the chamber 14 with the flange 90a provided at the upper end of the spring case 90 being supported on the upper end face of the small-diameter portion formed at the upper portion of the body 10. Therefore, in case it is intended to change the design of the motor-operated valve for an increased diameter $D_1$ of the orifice 16 for the purpose of controlling a higher flow, the spring case 90 (especially, a portion thereof in which the coil spring 92 is accommodated) should be relocated to above the chamber 14 in order to secure a space 14a for passage of a fluid inside the chamber 14. For this design change, the body 10 has to be extended axially as shown in FIG. 4, which however will lead to an increased size of the entire motor-operated valve.

Also, since the valve element 80 is guided by the spring case 90 which is a separate member from the body 10, it is difficult to assure a high coaxiality between a valve seat 18 formed at the body 10 and the valve element 80 and inclined surface 82 formed at the free end of the latter.

It is therefore desirable to overcome the above-mentioned drawbacks of the conventional art by providing a novel and improved motor-operated valve.

According to the present invention, there is provided a motor-operated valve including as basic elements:

a body having a seat formed therein;

a bush fixed to the body and having an internal thread formed inside;

a driver having an external thread which is in mesh with the internal thread of the bush;

a valve element arranged to abut on or come close to the seat when pressed by the driver;

a can firmly fixed to the body;

a rotor disposed pivotably inside the can and of which the rotation is transmitted to the valve element via the driver;

a stator disposed on the outer circumference of the can; and a coil spring means for forcing the valve element toward the rotor, at least a part of the coil spring means being disposed at the side of the bush.

According to the present invention, there may be provided a spring case disposed on the outer circumference of the bush and having an outer flange overhanged outwardly at the side of the rotor and engaged on or firmly fixed to the top of the valve element, and the coil spring means may be disposed between the outer flange and a stepped portion of the inner circumference of the body inside a space defined by the body and spring case.

According to the present invention, the body may include a guide portion to guide the valve element.

According to the present invention, the bore diameter of the seat may be nearly equal to the diameter of the guide portion and the valve element may have a pressure equalization path which provides communication between an end of the valve element which is at the side of the seat and a back pressure chamber located at an end of the valve element which is opposite to the seat-side end.

As mentioned above, with at least a part of the coil spring means being disposed at the side of the bush or with the coil spring means being disposed between the outer flange of the spring case and the stepped portion of the inner circumference of the body in the space defined by the body and spring case, it is possible to manufacture the motor-operated valve with no increase of its total height.

Also, with the guide portion being provided on the body to guide the valve element, it is possible to slide the valve element more smoothly.

Further, with the bore diameter of the seat being set nearly equal to the diameter of the guide portion and with the pressure equalization path being formed in the valve element to provide communication between the back pressure chamber located at the end of the valve element which is at the side of the seat and the back pressure chamber located at the end of the valve element which is opposite to the seat-side end, it is possible to keep the pressures before and after the valve element in balance with each other and thus provide a smaller actuator for the motor-operated valve, and hence it is possible to provide a more smaller motor-operated valve.

The foregoing and other features, aspects and advantages of the present invention will become more apparent from the following detailed description of embodiments of the present invention when taken in conjunction with the accompanying drawings. It should be noted that the present invention is not limited to the embodiments but can freely be modified without departing from the scope and spirit thereof defined in the claims given later.

DETAILED DESCRIPTION OF THE PREFERRED EMBODIMENTS

The present invention will be described in detail below concerning the embodiments thereof with reference to the accompanying drawings.

Figure 1:
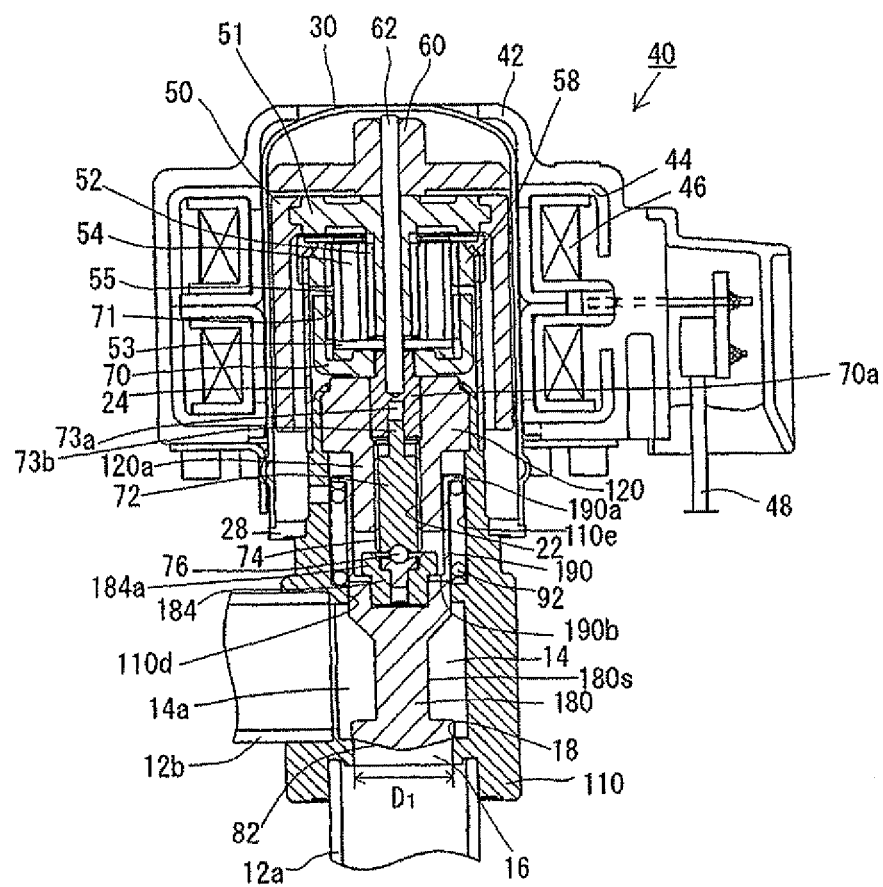
FIG. 1 is a longitudinal sectional view of the motor-operated valve according to one embodiment of the present invention.
Figure 4:
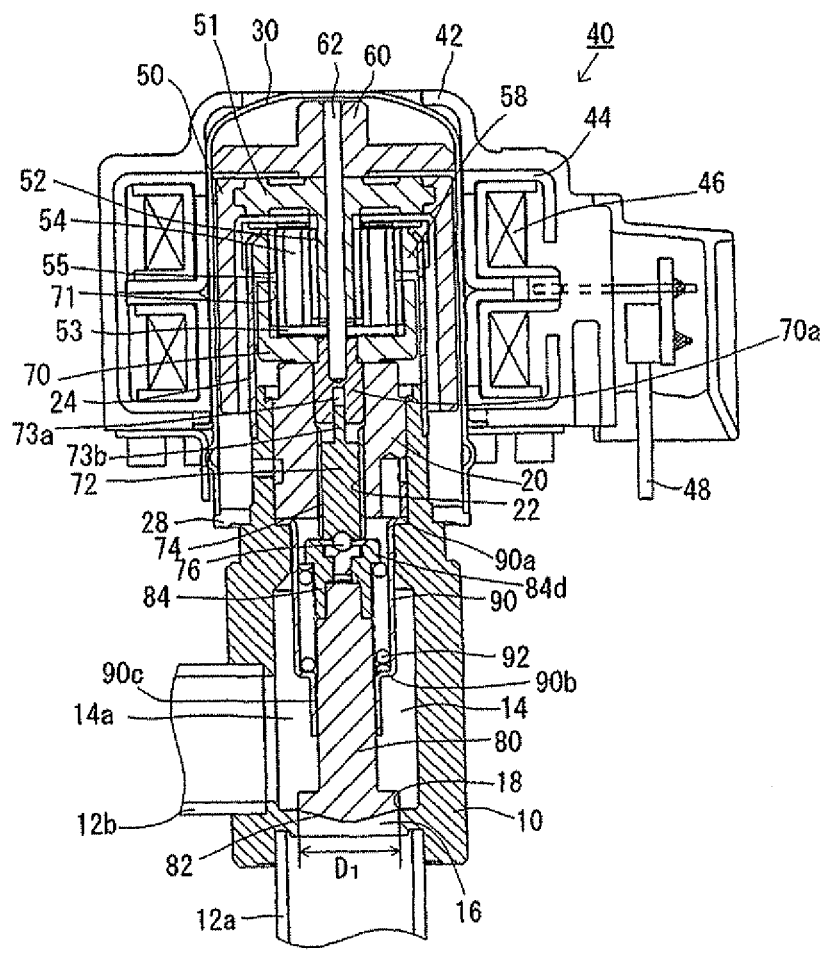
FIG. 4 is a longitudinal sectional view of an example of the conventional motor-operated valves.

FIG. 1 is a longitudinal sectional view of the motor-operated valve according to one embodiment of the present invention. In FIG. 1, the same or similar elements as or to those shown in FIG. 4 are indicated with the same or similar reference signs as or to those used in FIG. 4. So, such elements will not further be explained hereunder.

The motor-operated valve according to this embodiment includes a body 110. The body 110 has a seat 18 formed at the opening of an orifice 16 which is at the side of the chamber 14. The seat 18 faces an inclined surface 82 formed at the free end of a valve element 180. A bush 120 is firmly fixed to the top of the body 110, and a shank 70a firmly fixed to an output gear 70 is inserted in the upper portion of the bush 120. The shank 70a of the output gear 70 has formed therein a slit 73a in which a flat plate-shaped portion 73b of a driver 72 is inserted to be slidable axially. The driver 72 has formed thereon an external thread 74 which is in mesh with an internal thread 22 formed on the lower inner wall of the bush 120 to thereby transform the rotation of the output gear 70 into an axial linear motion for transmission to a locking member 184 fixed to the top of the valve element 180 via a pressing member 76. Thus, the valve element 180 is moved toward or away from the seat 18. The locking member 184 locks an inner flange 190b of a spring case 190 which will be further explained later.

The inner wall of a bore formed at the opening of the chamber 14 serving as a guide portion 110d guides the valve element 180 to slide at the outer circumference thereof which is at the side of the locking member 184. The inside diameter of the guide portion 110d is set nearly equal to the inside diameter $D_1$ of the seat 18 (inside diameter of the orifice 16).

The spring case 190 is formed cylindrical to have formed at the lower end thereof an inner flange 190b which projects inwardly. The inner flange 190b is installed to the valve element 80 between a large-diameter portion 184a formed at the upper portion of the locking member 184 and the valve element 80. A coil spring 92 is disposed between the outer surface of the spring case 190 and the inner wall of a bore 110e in the body 110 and set compressed between an outer flange 190a formed at the upper end of the spring case 190 to project outwardly and the upper surface of the guide portion 110d. Thus, the valve element 180 is normally forced along with the spring case 190 in the direction in which it is pushed up (the valve is opened).

In this embodiment, the bush 120 has formed at the lower portion thereof a small-diameter portion 120a which is inserted in the spring case 190. Thus, the upper half of the coil spring 92 is disposed in a position where it overlaps the bush 120 in the axial direction, and the coil spring 92 (and the spring case 190) is wholly disposed above the chamber 14 (at the side of the actuator).

FIG. 1 shows the valve element 180 resting on the seat 18. When the driver 72 ascends from this position as the rotor member 50 rotates in a predetermined direction, the spring case 190 is moved up under the elasticity of the coil spring 92 within a space defined by the outer circumference of the small-diameter portion 120*a* and the inner wall of the bore 110*e*, and the valve element 80 is also guided to ascend by the guide portion 110*d*.

Similarly, when the rotor member 50 rotates in the reverse direction, the driver 72 descends, and also the spring case 190 and valve element 180 are moved down against the elasticity of the coil spring 82.

Owing to the above-mentioned design, the space 14*a* of the chamber 14 opposite to the pipe 12*b* inserted in the side wall of the body 110 can be formed large enough to control a high flow without the necessity of increasing the axial size of the motor-operated valve.

Figure 2:
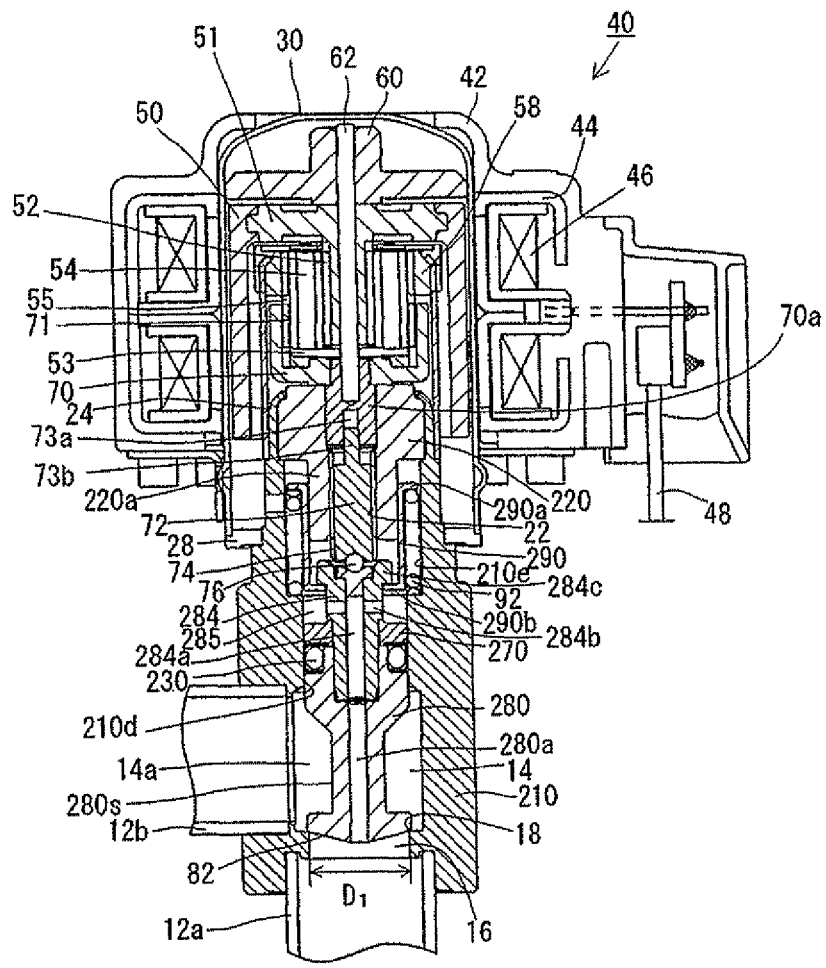
FIG. 2 is a longitudinal sectional view of the motor-operated valve according to another embodiment of the present invention.

FIG. 2 is a longitudinal sectional view of a motor-operated valve according to another embodiment of the present invention. In FIG. 2, the same or similar elements as or to those shown in FIGS. 1 and 4 are indicated with the same or similar reference signs as or to those used in FIGS. 1 and 4. So, such elements will not further be explained hereunder.

In this embodiment of the motor-operated valve, a pressure equalization path 280*a* is provided in the center of a valve element 280. Also there are provided in a locking member 284 a pressure equalization path 284*a* communicating with the pressure equalization path 280*a* in the valve element 280 and a pressure equalization path 284*b* which provides communication between the pressure equalization path 284*a* and a back pressure chamber 285. Thus, a fluid pressure in a pipe 12*a* is introduced into the back pressure chamber 285. These pressure equalization paths 280*a*, 284*a* and 284*b* and back pressure chamber 285 thus provided permit to eliminate the difference between pressures applied to the upper and lower portions, respectively, of the valve element 280. A sealing member 230 is fitted between the valve element 280 and a guide portion 210*d* of a body 210 and fixed with a holding member 270 around the locking member 284.

In this embodiment, there is provided a cylindrical spring case 290 having an inner flange 290*b* provided at the lower portion thereof. The inner flange 290*b* is engaged on the bottom of a large-diameter portion 284*c*.

The coil spring 92 is disposed between the outer surface of the spring case 290 and the inner wall of a bore 210*e* in the body 210, and compressed between an outer flange 290*a* provided at the upper end of the spring case 290 to project outwardly and the upper surface of the guide portion 210*d*. Thus, the valve element 280 is normally forced along with the spring case 290 in the direction in which it is pushed up (the valve is opened).

Also in this embodiment, there is provided a bush 220 having provided at the lower portion thereof a small-diameter portion 220*a* which is inserted in the spring case 290. Thus, the upper half of the coil spring 92 is disposed in a position where it overlaps the bush 220 in the axial direction, and the coil spring 92 (and a spring case 290) is wholly disposed above the chamber 14 (at the side of the actuator).

FIG. 2 shows the valve element 280 resting on the seat 18 as in FIG. 1. When the driver 72 ascends from this position as the rotor member 50 rotates in a predetermined direction, the spring case 290 is moved up under the elasticity of the coil spring 92 within a space defined by the outer circumference of the small-diameter portion 220*a* and the inner wall of the bore 210*e*, and the valve element 280 is also guided to ascend by the guide portion 210*d*.

Also, when the rotor member 50 rotates in the reverse direction, the driver 72 descends, and also the spring case 290 and valve element 280 are moved down against the elasticity of the coil spring 92.

Owing to the above-mentioned design, the inner space 14*a* of the chamber 14 opposite to the pipe 12*b* inserted in the side wall of the body 210 can be designed large enough to control a high flow without the necessity of increasing the axial size of the motor-operated valve.

In this embodiment, the inside diameter of the guide portion 210*d* is set nearly equal to the inside diameter $D_1$ of the seat 18 and the fluid at the pipe 12*a* is introduced into a back pressure chamber 285, whereby the axial forces applied to the back and front of the valve element 280 are balanced with each other.

Owing to this design, the valve element 80 can be operated with a small thrust.

Figure 3:
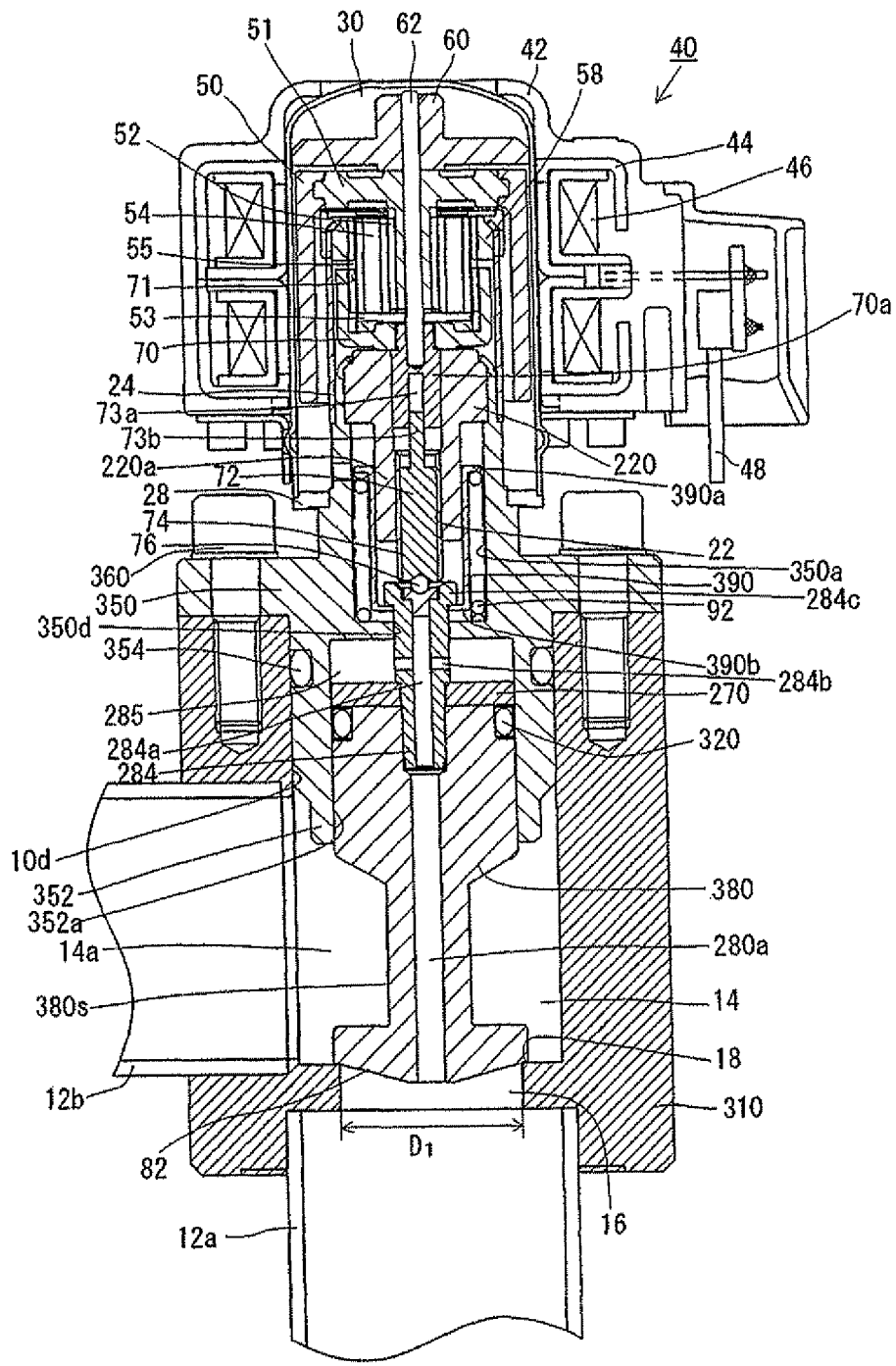
FIG. 3 is a longitudinal sectional view of the motor-operated valve according to a further embodiment of the present invention.

FIG. 3 is a motor-operated valve according to still another embodiment of the present invention. In FIG. 3, the same or similar elements as or to those shown in FIGS. 1, 2 and 4 are indicated with the same or similar reference signs as or to those used in FIGS. 1, 2 and 4. So, such elements will not further be explained hereunder.

The motor-operated valve according to this embodiment is applied for control of a higher flow. In this embodiment, the valve body includes a barrel 310 and lid 350.

In an opening at the top of the chamber 14 of the barrel 310, the lid 350 serving as a guide portion for a valve element 380 is firmly fixed with a bolt 360. A clearance between the lid 350 and barrel 310 is sealed with a sealing member 354. The lid 350 includes a cylindrical portion 352 which is inserted in the chamber 14. The valve element 380 is inserted and slides in a guide portion 352*a* which is a bore formed in the cylindrical portion 352. The locking member 284 firmly fixed to the valve element 380 is supported slidably on a small-diameter portion 350*d* of the lid 350.

It should be noted that since the valve element 380 is supported slidably in the guide portion 352*a*, it is not necessary to slide the locking member 284 and small-diameter portion 350*d* but a clearance may be provided between these members.

A sealing member 320 is fitted between the valve element 380 and guide portion 352*a* and fixed with the holding member 270 around the locking member 284.

In this embodiment, there is provided a cylindrical spring case 390 having an inner flange 390*b* provided at the lower portion thereof. The inner flange 390*b* is engaged on the bottom of the large-diameter portion 284*c* provided at the upper portion of the locking member 284.

The coil spring 92 is disposed between the outer surface of the spring case 390 and the inner wall of a bore 350*a* in the lid 350, and compressed between an outer flange 390*a* provided at the upper end of the spring case 390 to project outwardly and the upper surface of the small-diameter portion 350*d*. Thus, the valve element 380 is normally forced along with the spring case 390 in the direction in which it is pushed up (the valve is opened).

Also in this embodiment, the small-diameter portion 220*a* provided at the lower portion of the bush 220 is adapted to be inserted inside the spring case 390. Thus, the upper half of the coil spring 92 is disposed in a position where it overlaps the bush 220 in the axial direction, and the coil spring 92 (and a spring case 390) is wholly disposed above (at the side of the actuator) the chamber 14.

According to this embodiment, the motor-operated valve is designed for the valve element 380 to slide long in the guide portion 352*a*. Therefore, even a larger valve element 380 can be guided positively with a high concentricity with the seat 18.

Also, the inside diameter of the guide portion 352*a* in which the valve element 380 is housed is set nearly equal to the inside diameter $D_1$ of the seat 18.

Further, the pressure equalization path 280*a* is provided in the center of the valve element 380. In the locking member 284 there are provided the pressure equalization path 284*a* communicating with the pressure equalization path 280*a* and also the pressure equalization path 284*b* which provides communication between the pressure equalization path 284*a* and back pressure chamber 285. These pressure equalization paths 280*a*, 284*a* and 284*b* and back pressure chamber 285 thus provided permit to introduce a fluid pressure in the pipe 12*a* into the back pressure chamber 285, whereby the difference between pressures applied to the upper and lower portions, respectively, of the valve element 380 can be eliminated.

Owing to this design, the valve element 380 can be operated with a small thrust.

As having been described in the foregoing, the valve element 180 (280 and 380) has the inclined surface 82 formed at the front end thereof to abut on the seat and a smaller-diameter portion 180*s* (280*s* and 380*s*) as shown in FIGS. 1 to 3 and hence the motor-operated valve of this design is suitable for high-flow control among others. However, it should be noted that the present invention is not limited to the high-flow control motor-operated valve alone but is applicable to a low-flow control motor-operated valve including a valve element having no smaller-diameter portion.

The entire disclosure of Japanese Patent Application No. 2011-078702 filed Mar. 31, 2011, is expressly incorporated by reference herein.

What is claimed is:

1. A motor-operated valve comprising:
a body having a seat formed therein;
a bush fixed to the body and having an internal thread formed inside;
a driver having an external thread which is in mesh with the internal thread of the bush;
a valve element arranged to abut on or come close to the seat when pressed by the driver;
a can firmly fixed to the body;
a rotor disposed pivotably inside the can and of which the rotation is transmitted to the valve element via the driver;
a stator disposed on the outer circumference of the can; and
a coil spring means for forcing the valve element toward the rotor, at least a part of the coil spring means being disposed so as to surround an outer circumference or outer periphery of the bush; and
a spring case disposed in contact with the outer circumference or outer periphery of a small-diameter portion of the bush.

2. A motor-operated valve comprising:
a body having a seat formed therein;
a bush fixed to the body and having an internal thread formed inside;
a driver having an external thread which is in mesh with the internal thread of the bush;
a valve element arranged to abut on or come close to the seat when pressed by the driver;
a can firmly fixed to the body;
a rotor disposed pivotably inside the can and of which the rotation is transmitted to the valve element via the driver;
a stator disposed on the outer circumference of the can;
a coil spring means for forcing the valve element toward the rotor; and
a spring case disposed on the outer circumference of a small-diameter portion of the bush and having an outer flange overhanged outwardly in a direction away from the bush at the side of the rotor and an inner flange provided engaged on or firmly fixed to the top of the valve element,
wherein the coil spring means is disposed between the outer flange and a stepped portion of the inner circumference of the body inside a space defined between the body and spring case; and
wherein the spring case is adjacent to the entire inner cylindrical length of the unactuated spring.

3. The motor-operated valve according to claim 1, wherein the body includes a guide portion to guide the valve element.

4. The motor-operated valve according to claim 2, wherein the body includes a guide portion to guide the valve element.

5. The motor-operated valve according to claim 1, wherein:
the bore diameter of the seat is nearly equal to the diameter of the guide portion; and
the valve element has a pressure equalization path which provides communication between an end of the valve element which is at the side of the seat and a back pressure chamber located at an end of the valve element which is opposite to the seat-side end.

6. The motor-operated valve according to claim 2, wherein:
the bore diameter of the seat is nearly equal to the diameter of the guide portion; and
the valve element has a pressure equalization path which provides communication between an end of the valve element which is at the side of the seat and a back pressure chamber located at an end of the valve element which is opposite to the seat-side end.

7. The motor-operated valve according to claim 3, wherein:
the bore diameter of the seat is nearly equal to the diameter of the guide portion; and
the valve element has a pressure equalization path which provides communication between an end of the valve element which is at the side of the seat and a back pressure chamber located at an end of the valve element which is opposite to the seat-side end.

8. The motor-operated valve according to claim 4, wherein:
the bore diameter of the seat is nearly equal to the diameter of the guide portion; and
the valve element has a pressure equalization path which provides communication between an end of the valve element which is at the side of the seat and a back pressure chamber located at an end of the valve element which is opposite to the seat-side end.

* * * * *